(12) United States Patent
Ver Steeg et al.

(10) Patent No.: US 8,577,998 B2
(45) Date of Patent: Nov. 5, 2013

(54) SYSTEMS AND METHODS OF DETECTING NON-COLOCATED SUBSCRIBER DEVICES

(75) Inventors: William C. Ver Steeg, Alpharetta, GA (US); Peter G. Briggs, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 884 days.

(21) Appl. No.: 12/169,012

(22) Filed: Jul. 8, 2008

(65) Prior Publication Data

US 2010/0011094 A1 Jan. 14, 2010

(51) Int. Cl.
*G06F 15/177* (2006.01)
*H04M 11/04* (2006.01)
*H04L 12/28* (2006.01)

(52) U.S. Cl.
USPC .................. 709/220; 455/404.2; 370/254

(58) Field of Classification Search
USPC .......................................................... 709/220
See application file for complete search history.

(56) References Cited

U.S. PATENT DOCUMENTS

| | | | |
|---|---|---|---|
| 5,467,382 A | | 11/1995 | Schorman |
| 5,650,994 A * | | 7/1997 | Daley ............................ 370/259 |
| 5,724,510 A | | 3/1998 | Arndt et al. |
| 6,393,484 B1 | | 5/2002 | Massarani |
| 6,452,925 B1 * | | 9/2002 | Sistanizadeh et al. ........ 370/352 |
| 6,493,340 B1 | | 12/2002 | Kawanaka |
| 6,603,758 B1 | | 8/2003 | Schmuelling et al. |
| 6,745,333 B1 | | 6/2004 | Thomsen |
| 7,058,022 B1 * | | 6/2006 | Carolan et al. ................ 370/254 |
| 7,085,267 B2 * | | 8/2006 | Carey et al. .................... 370/389 |
| 7,272,846 B2 | | 9/2007 | Williams et al. |
| 7,337,219 B1 * | | 2/2008 | Meenan et al. ................ 709/220 |
| 7,388,869 B2 * | | 6/2008 | Butehorn et al. ............. 370/401 |
| 7,477,613 B2 * | | 1/2009 | Zein Al-Abedeen et al. . 370/254 |
| 7,593,341 B1 * | | 9/2009 | Buriol et al. ................... 370/238 |
| 7,701,873 B2 * | | 4/2010 | Prigent et al. .................. 370/254 |
| 8,145,733 B1 * | | 3/2012 | Cheng et al. ................... 709/220 |
| 2001/0049729 A1 * | | 12/2001 | Carolan et al. ................ 709/220 |
| 2002/0165972 A1 | | 11/2002 | Chien et al. |
| 2002/0186694 A1 * | | 12/2002 | Mahajan et al. ............... 370/390 |
| 2003/0046291 A1 * | | 3/2003 | Fascenda ......................... 707/10 |
| 2004/0132451 A1 * | | 7/2004 | Butehorn et al. ............. 455/445 |
| 2004/0158626 A1 * | | 8/2004 | Douglas ......................... 709/224 |
| 2005/0038880 A1 * | | 2/2005 | Danforth ........................ 709/222 |
| 2005/0105524 A1 * | | 5/2005 | Stevens et al. ................ 370/389 |
| 2005/0220007 A1 * | | 10/2005 | Prigent et al. .................. 370/217 |
| 2006/0018253 A1 * | | 1/2006 | Windisch et al. ............. 370/216 |
| 2006/0085357 A1 | | 4/2006 | Pizarro |
| 2007/0030842 A1 * | | 2/2007 | Borden et al. ................. 370/352 |
| 2008/0076386 A1 | | 3/2008 | Khetawat et al. |

(Continued)

FOREIGN PATENT DOCUMENTS

WO WO 2007/106902 A2 9/2007

OTHER PUBLICATIONS

International Search Report dated Apr. 12, 2010 cited in Application No. PCT/US2009/049576.

*Primary Examiner* — Firmin Backer
*Assistant Examiner* — James Edwards
(74) *Attorney, Agent, or Firm* — Merchant & Gould

(57) ABSTRACT

In one embodiment, a method comprises receiving address configuration information for each of a plurality of subscriber devices associated with the same customer account. The method also comprises identifying, using the address configuration information, any of the subscriber devices that are not colocated with the other subscriber devices associated with the same customer account.

20 Claims, 10 Drawing Sheets

(56) References Cited

U.S. PATENT DOCUMENTS

| | | | |
|---|---|---|---|
| 2008/0084888 A1* | 4/2008 | Yadav et al. | 370/395.31 |
| 2008/0098458 A2 | 4/2008 | Smith et al. | |
| 2008/0109864 A1 | 5/2008 | Danforth et al. | |
| 2008/0126553 A1* | 5/2008 | Boucher et al. | 709/230 |
| 2008/0182589 A1* | 7/2008 | Buccieri | 455/456.3 |
| 2008/0195457 A1* | 8/2008 | Sherman et al. | 705/10 |
| 2008/0200143 A1* | 8/2008 | Qiu et al. | 455/404.2 |
| 2008/0281966 A1* | 11/2008 | Jennings et al. | 709/225 |
| 2008/0304487 A1* | 12/2008 | Kotecha | 370/392 |
| 2009/0003312 A1* | 1/2009 | Velazquez et al. | 370/352 |
| 2009/0207757 A1* | 8/2009 | Andreasen et al. | 370/254 |
| 2009/0296566 A1* | 12/2009 | Yasrebl et al. | 370/221 |

* cited by examiner

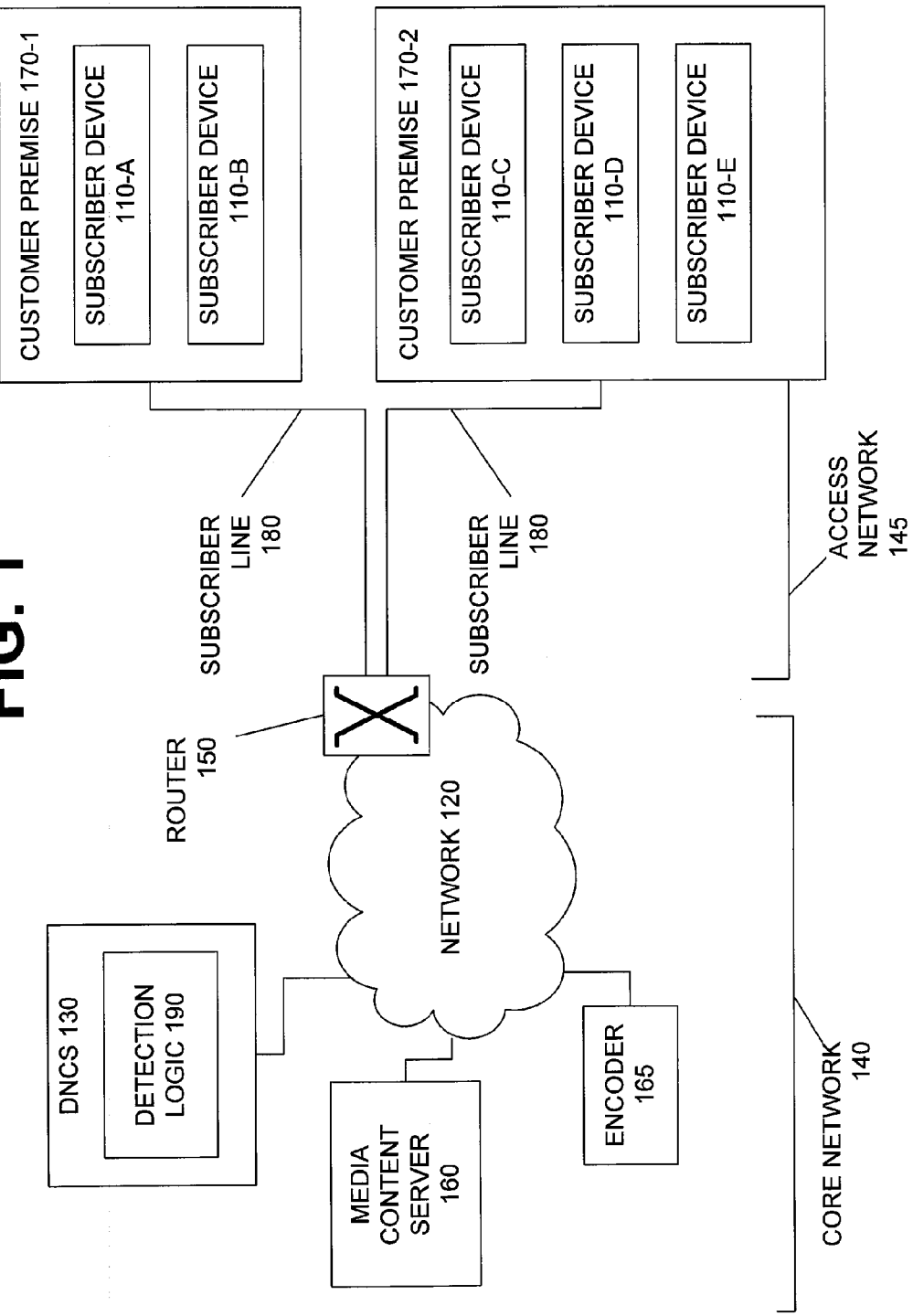

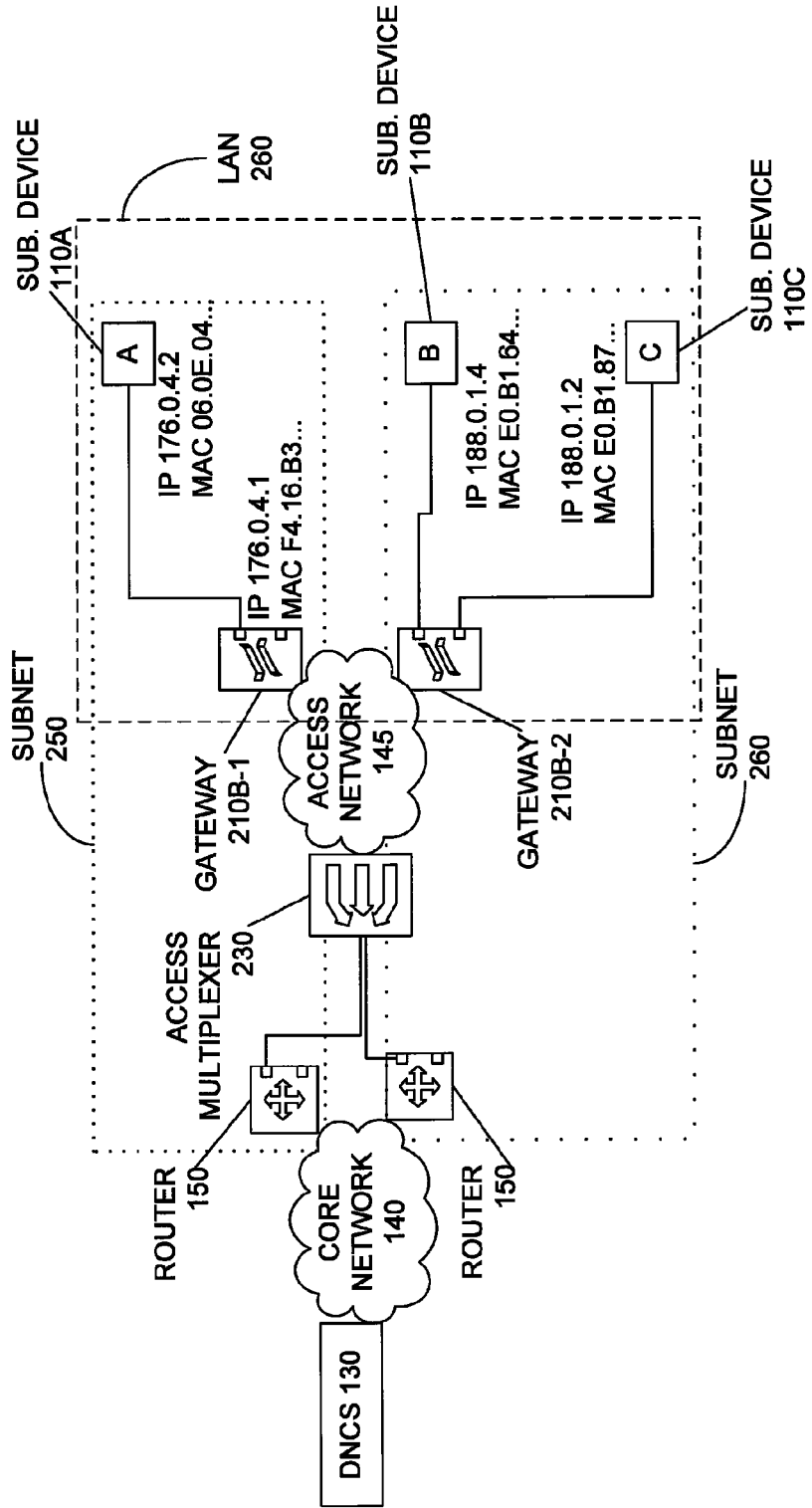

SYSTEMS AND METHODS OF DETECTING NON-COLOCATED SUBSCRIBER DEVICES

CROSS REFERENCE TO RELATED APPLICATIONS

Not applicable.

FIELD OF THE DISCLOSURE

The present disclosure relates generally to network devices.

BACKGROUND

Service providers deliver many different types of services to consumers over broadband networks, including video (e.g., television, movies, sporting events), music, telephone, and Internet data service. These services are received and/or consumed using various electronics devices such as set-top boxes, digital home communications terminals, residential gateways, digital music receivers, personal computers, personal digital assistants, digital telephones, etc. Since the provider typically charges a subscriber for these services, theft of service is generally a concern for providers. Theft may be outright, as when the electronic device is cloned, and both the clone and the original receive the service, or the theft may be a result of "subletting" or renting a device. For example, depending on the pricing structure of the service, the service provider may lose revenue when a subscriber registers more than one device with the service provider, then "sublets" or rents one of the devices to a neighbor. Thus, a need arises for these and other concerns to be addressed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 1 is a block diagram of an environment in which one embodiment of a system and method for detecting non-colocated subscriber devices is located.

FIGS. 2A, 2B, and 2C illustrate example arrangements in which subscriber gateways are used to deliver edge traffic to the customer premise of FIG. 1.

DESCRIPTION OF EXAMPLE EMBODIMENTS

Overview

Figure 2A:
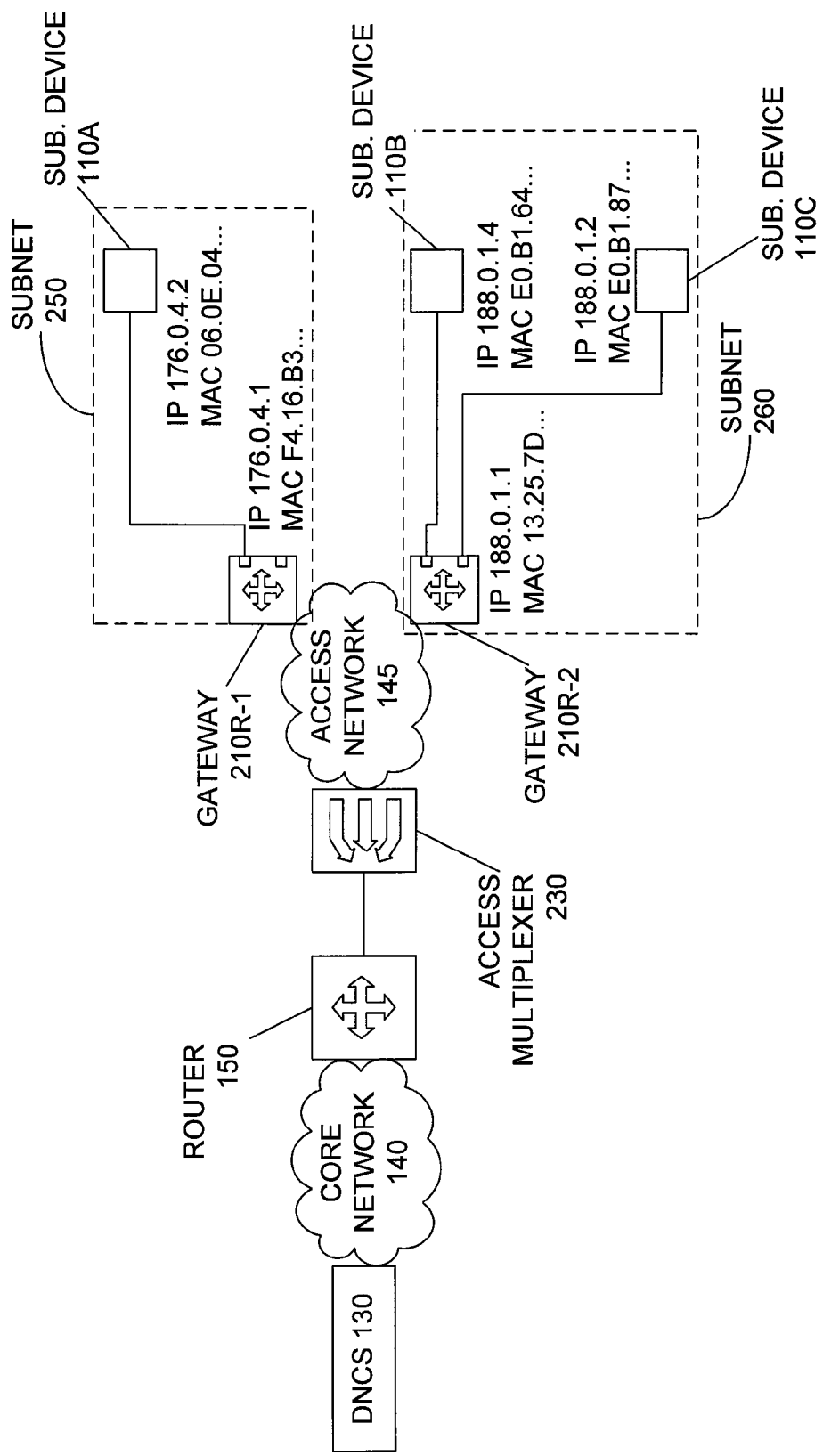

The embodiments disclosed herein provide systems and methods for detecting non-colocated subscriber devices. One such embodiment is a method comprising receiving address configuration information for each of a plurality of subscriber devices associated with the same customer account. The method also comprises identifying, using the address configuration information, any of the subscriber devices that are not colocated with the other subscriber devices associated with the same customer account.

Example Embodiments

FIG. 1 is a block diagram of an environment in which one embodiment of a system and method for detecting non-colocated subscriber devices is located. System 100 delivers services such as television programming, movies, sports events, music, Internet data access, etc. to subscriber devices (e.g., 110-A, 110-B, 110-C, 110-D, 110-E) over network 120. In addition to subscriber devices 110-A . . . system 100 also includes a digital network control system (DNCS) 130 which manages and provisions subscriber devices 110. Network 120 includes a core network 140 and an access network 145 with routers 150 located at the edge between the two networks. The content of the delivered services may be provided by various sources such as media content servers 160 and encoders 165 which also communicate over network 120.

Each subscriber device 110 resides at a particular physical location or customer premise 170, and each customer premise is connected to access network 145 via a subscriber line 180. Multiple subscriber devices 110 can reside at the same customer premise 170 and thus receive services over the same subscriber line 180. In the example environment of FIG. 1, customer premise 170-1 includes two subscriber devices (110-A and 110-B), while customer premise 170-2 includes three subscriber devices (110-C, 110-D, and 110-E).

DNCS 130 controls access to system services by requiring each subscriber device 110 to register with DNCS 130 after start up. During log-on, DNCS 130 identifies the subscriber device 110, and before providing services to that subscriber device 110, DNCS 130 verifies that the subscriber device 110 is associated with a customer account. Using techniques described herein, detection logic 190 within DNCS 130 determines whether all subscriber devices 110 registered for a particular account are also located at the customer premise associated with that account. (The log-on and detection processes will be explained in further detail in connection with FIGS. 3 and 4.)

Identification of non-colocated subscriber devices 110 through detection logic 190 allows the service provider to avoid potential revenue loss. For example, consider the following price structure whereby a service provider charges $40 per month for service to one subscriber device at a single customer premise, plus $7 per month for each additional subscriber device at that customer premise. Thus, when both customer premises 170-1 and 170-2 sign up for service for all their devices, the service provider would expect revenue of $40+$7 ($47) from customer premise 170-1 and $40+2×$7 ($54) from customer premise 170-2, for a total of $101 per month. However, this price structure also creates an incentive for the two customers to reach an alternative arrangement where one customer pays for all five devices, then "sublets" one or more of the devices to the other customer premise. Without detection logic 190, customer premise 170-1 could sign up to receive service for five devices (110-A . . . E)—even though only two of these devices (110A and 110B) are actually located at customer premise 170-1, while the remaining devices (110-C, D, and E) are located at the other customer premise 170-2. In this scenario, the total monthly revenue is only $54. Monthly revenue from customer premise 170-1 is increased to $40+2×$7 ($54), but the provider receives no revenue at all from customer premise 170-2. The techniques described herein allow service providers to detect the presence of a subscriber device located at a premise that is different than the registered premise (e.g., non-colocated), thus avoiding this revenue loss of $47 per month. The techniques are also applicable to detect the delivery of enhanced or premium services to subscriber devices located at a premise that has registered for a basic, but not an enhanced or premium service. Such techniques are also applicable to detect the delivery of services to a greater number of subscriber devices than a customer has registered for.

Figure 2B:
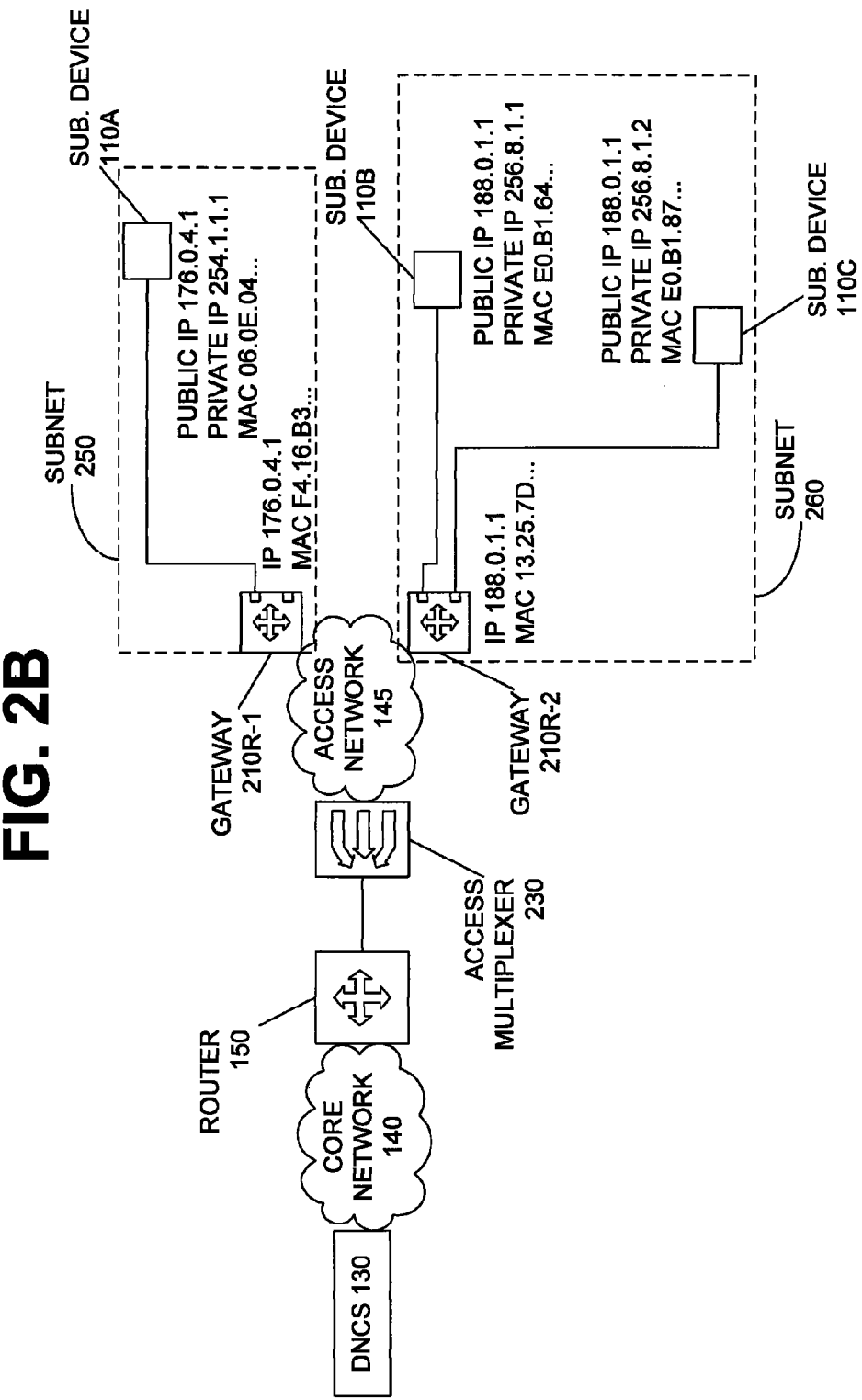

As should be known to a person of ordinary skill in the art, various network arrangements or topologies can be used between the network edge and the customer premise 170. Several such configurations are illustrated in FIGS. 2A-C. As can be seen in FIGS. 2A-C, each customer premise 170 connects to network 120 through a corresponding subscriber gateway 210. Multiple subscriber gateways 210 communicate with an access multiplexer 230. Access multiplexer 230 is in turn coupled to a core router or forwarding device 150, which communicates with DNCS 130 over core network 140. Various technologies can be used to implement access network 145, including, but not limited to, digital subscriber loop (DSL), active or passive optical network (PON), Metro-Ethernet, fiber to the premises (FTTP), fiber to the curb (FTTC), and hybrid fiber-coax (HFC). In some embodiments, access network 145 is point-to-point. In others, access network 145 is point-to-multipoint.

Though the topologies of FIGS. 2A, B, and C differ, in each case the "last hop" or "last leg" router for customer premise 170-1 is different than the last hop router for customer premise 170-2. As mentioned above, and explained further below in connection with FIGS. 3-6, some embodiments of detection logic 190 detect and exploit this difference in order to determine whether or not all subscriber devices 110 registered for a particular account are also located at the customer premise associated with that account.

FIG. 2A illustrates an example arrangement in which subscriber gateways 210R are used to route edge traffic to the customer premise 170. The routing function of a subscriber gateway 210R can be implemented by a router, a layer-3 switch, or any device which forwards packets based on layer-3 information. Subscriber gateway 210R-1 acts as a router for subnetwork 250, which contains subscriber device 110-A as well as the router itself. Subscriber gateway 210R-1 examines the layer-3 headers of received packets and forwards the packets to the appropriate device within subnetwork 250. In this example, subnetwork 250 has IP address range 176.0.4.X, subscriber gateway 210R-1 has IP address address 176.0.4.1, and subscriber device 110-A has IP address address 176.0.4.2. Each device also has a MAC address as shown.

Similarly, subscriber gateway 210R-2 acts as a router for subnetwork 260, which contains subscriber devices 110-B and 110-C as well as the router itself. In this example, subnetwork 260 has IP address range 188.0.1.X, subscriber gateway 210R-2 has IP address 188.0.1.1, subscriber device 110-B has IP address 188.0.1.4, and subscriber device 110-C has IP address 188.0.1.2.

FIG. 2B illustrates an example arrangement in which subscriber gateways 210N route traffic to the customer premise 170 and also perform network address translation (NAT). The arrangement is similar to that of FIG. 2A, but each subscriber gateway 210N also translates between private and public IP addresses for devices within a subnetwork. Subscriber gateway 210N-1 acts as a router for subnetwork 250, which contains subscriber device 110-A as well as the router itself. In this example, subnetwork 250 has (public) IP address range 176.0.4.X, and subscriber gateway 210N-1 has (public) IP address 176.0.4.1. Subscriber device 110-A has the same public IP address as subscriber gateway 210N-1, and also has a private IP address 254.1.1.1. Similarly, subscriber gateway 210N-2 acts as a router for subnetwork 260, which contains subscriber devices 110-B and 110-C as well as the router itself. Subnetwork 260 has IP address range 188.0.1.X, and subscriber gateway 210N-2 has IP address 188.0.1.1. Both subscriber device 110-B and 110-C have the same public IP address as 210N-2, while subscriber device 110-B has private IP address 256.8.1.1 and subscriber device 110-C has private IP address 256.8.1.2.T.

FIG. 2C illustrates an example arrangement in which subscriber gateways 210B bridge (forward at the MAC layer) traffic to the customer premise 170. In this bridged configuration, all subscriber devices coupled to the same access multiplexer 230 are part of the same LAN 260. Routing is performed "behind" access multiplexer 230: router 150-A routes traffic to subnetwork 250, which contains subscriber device 110-A, and router 150-B routes traffic to subnetwork 260 which contains subscriber devices 110-B and 110-C. In this example, subnetwork 250 has IP address range 176.0.4.X and subscriber device 110-A has IP address address 176.0.4.2. Subnetwork 260 has IP address range 188.0.1.X, subscriber device 110-B has IP address 188.0.1.4, and subscriber device 110-C has IP address 188.0.1.2.

FIGS. 2A-C show various network configurations in which subscriber devices 110 at different customer premises 170 have different last-hop routers and belong to different subnets. Techniques are now described which detect and exploit this difference, in order to determine whether or not all subscriber devices 110 registered for a particular account are also located at the customer premise associated with that account.

Figure 3:
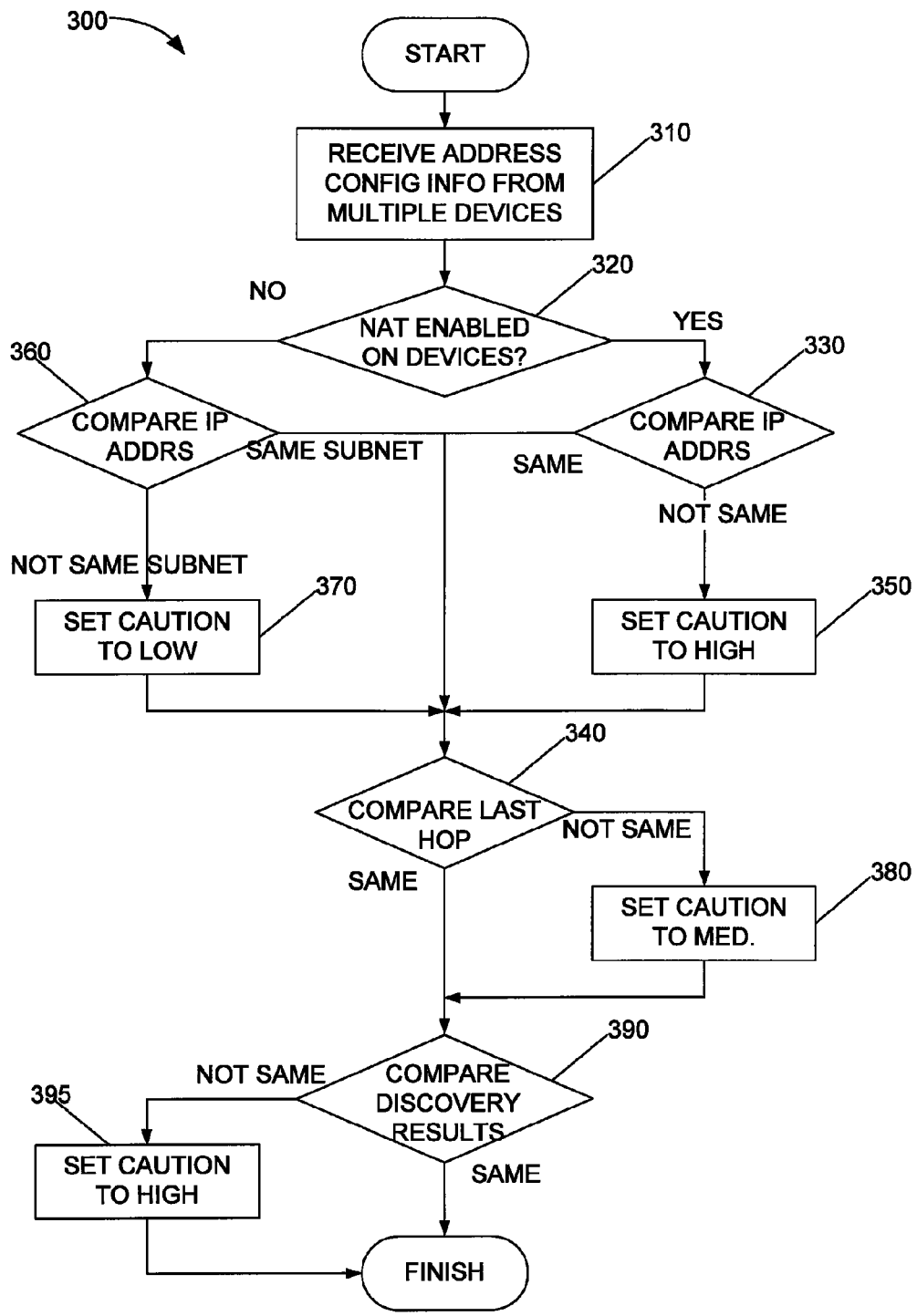
FIG. 3 is a flowchart illustrating a process performed by an embodiment of detection logic from FIG. 1.

FIG. 3 is a flowchart illustrating a process performed by one embodiment of detection logic 190, which detects and flags devices that are on the same account and are suspected of not being colocated. Process 300 begins at block 310, where address configuration information is received from various subscriber devices 110 that are associated with the same customer account. The address configuration information associated with a particular subscriber device 110 may describe the subscriber device 110 and/or the last hop router that the subscriber device 110 communicates with, and/or other subscriber devices in the same multicast group as the subscriber device 110. The address configuration may include addresses at various layers in the protocol stack, for example, a MAC address, and/or an IP address. The address configuration information may also include a flag which indicates whether the IP address of the device has been translated, i.e., a network address translation (NAT) flag. The address configuration information may also include results from a previous multicast discovery performed by the subscriber device 110 (i.e., a list of other subscriber devices found when subscriber device 110 performed a multicast discovery).

Processing continues at block 320, which begins a process of comparing address information for the various subscriber devices 110, and detecting differences among them. At block 320, the NAT flag is checked (if present). If NAT is enabled, processing continues at block 330, where the IP addresses of all subscriber devices 110 that are associated with the same customer account are compared. In a NAT configuration, the subscriber gateway maps each subscriber device's private IP address to the same public IP address (typically, one associated with the gateway or with the NAT functionality residing in the gateway). Thus, if any device 110 has a different address than the others, this is a relatively strong indication that the offending device is not colocated with the others, so a caution level is set at block 350, and processing continues at block 340. In this embodiment, the caution level is set to High at block 350, since this is a relatively strong indication that non-colocation has been detected among devices using NAT. However, other caution levels may be used. Returning to the IP address check at block 330, if all devices 110 in the group have the same (translated) IP address, the caution level is not modified, but an additional level of detection is performed at block 340.

Returning now to the NAT check at block 320, if NAT is not in use, then processing continues at block 360, where the IP addresses of all subscriber devices 110 that are associated with the same customer account are compared. If the IP addresses indicate that all devices 110 in the group belong to the same IP subnet, then an addition level of detection is performed at block 340. However, if any device 110 has a different IP subnet than the others, this is an indication that the offending device may not be colocated with the others. Thus, a caution flag is set at block 370 and processing continues at block 340. In this embodiment, the caution flag is set to Low at block 370, since this is only the first indication that non-colocation has been detected among devices not using NAT. However, other caution levels may be used.

Colocated subscriber devices 110 typically share the same last hop router, so a subscriber device 110 that has a different last hop forwarding address (of the same address type) is not colocated. Thus, as an additional level of detection, block 340 examines the last hop forwarding addresses (if such information was obtained during process 300) for all devices 110 on the same account. If more than one address is detected, a caution level is set at block 380 and process 300 is complete. In this embodiment, the caution level is set to Medium at block 380, since this is a stronger indication that non-colocation has been detected. However, other caution levels may be used.

Subscriber devices 110 that are colocated are also in the same multicast group. Therefore, when a particular subscriber device 110 performs a multicast discovery, that subscriber device 110 should be able to find all other subscriber devices on the same account; if a subscriber device 110 is missing, this is an indication that the missing subscriber device 110 is not colocated. Thus, as an additional level of detection, block 390 examines multicast discovery results that may be present in the address configuration information retrieved at block 310. If present for a particular subscriber device 110, these results contain a list of other subscriber devices found when that subscriber device 110 performed a multicast discovery. Block 390 compares the list of discovered subscriber devices with a list of subscriber devices that are associated with the same customer account. A subscriber device 110 that is associated with the customer account but is not present on the list of discovered subscriber devices is an indication the missing device is not colocated. In this case, a caution flag is set at block 395. In this embodiment, the caution flag is set to High at block 395, since this is a strong indication that non-colocation has been detected. After the multicast groups are examined, process 300 completes.

Although not specifically illustrated here, other types of address configuration information can also be obtained at block 310 and examined in process 300. As one example, all devices 110 at a particular customer premise 170 are on the same LAN (or set of bridged LANs). Therefore, the ARP tables of all devices 110 on the same account can be expected have similar entries; finding otherwise is an indication of non-colocation. For another example, colocated subscriber devices 110 can be expected to have the same DHCP server, so the address of the DHCP server can be obtained and examined to determine non-colocation. As yet another example, colocated subscriber devices 110 can be expected to have not only the same last-hop forwarding device, but also to have the same hop-by-hop trail from the subscriber device to the forwarding device. Therefore, information generated by the known IP datagram "record route" option can be obtained and analyzed to determine co-location.

Figure 4:
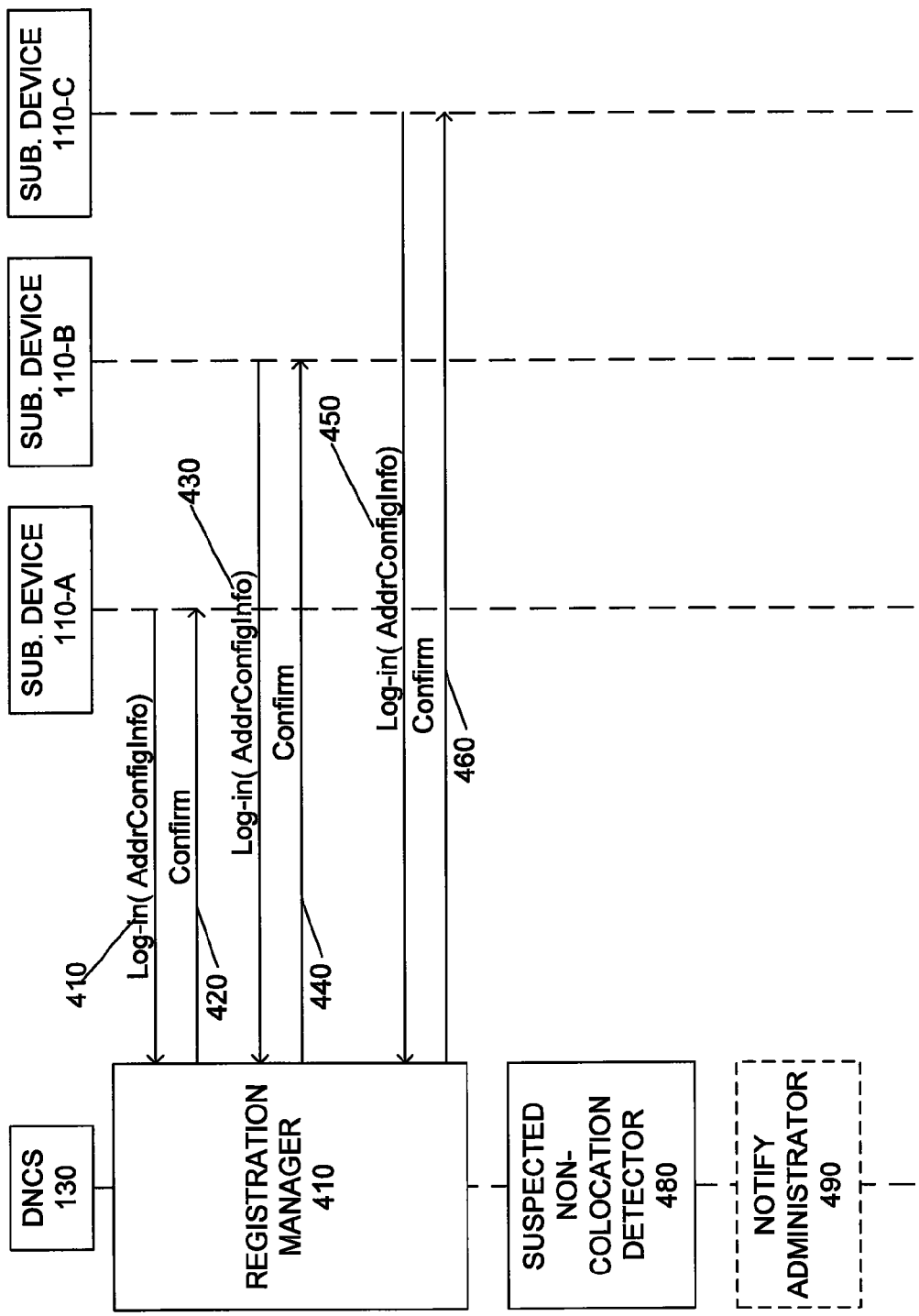
FIG. 4 is a messaging diagram showing interactions between one embodiment of a DNCS and one embodiment of the subscriber devices from FIG. 1.

FIG. 4 is a messaging diagram showing interaction between one embodiment of DNCS 130 and various subscriber devices 110, in which process 300 is executed. In this example embodiment, DNCS 130 includes several functional components, including registration manager 410, detector 480, and notifier 490

Registration manager 410 handles registration of subscriber devices 110. Before receiving services, each subscriber device 110 identifies itself to DNCS 130 by sending a log-on or sign-in message. DNCS 130 responds by authenticating the identity of the subscriber device 110 and sending back a confirmation message.

In the scenario illustrated in FIG. 4, there are three subscriber devices associated with the same account. Subscriber device 110-A sends a log-on message 410, and DNCS 130 replies with a confirmation message 420. Subscriber device 110-B then sends a log-on message 430, and DNCS 130 replies with a confirmation message 440. Subscriber device 110-C 110 sends a log-on message 450 and DNCS 130 replies with a confirmation message 460. The log-on is typically performed as a part of the device boot process, and it will be understood that subscriber devices can register in any order relative to each other. In some embodiments, log-on messages 410, 430, and 450 may take the form of a digital storage media command and control (DSM-CC) User-to-Network configuration (UNConfig) request.

Conventional methods typically use a log-on message which includes a device identifier (e.g., serial number), and optionally includes an account identifier for the customer premise 170. According to some of the methods disclosed herein, log-on messages 410, 430, and 450 also include address configuration information, as described above in connection with FIG. 3.

After all subscriber devices 110 have successfully registered, detector 480 uses the address configuration information to determine whether any of the subscriber devices 110 that registered for the same account are suspected of being located at a different customer premise than the one associated with that account. In some embodiments, notifier 490 takes action to an administrator that at least one suspicious subscriber device 110 was detected. Various mechanisms may be used for this notification, for example, e-mail, pager, instant message, text message, etc. In some embodiments, the suspicious activity is logged in a file or database, and this logging acts as the notification.

Figure 5:
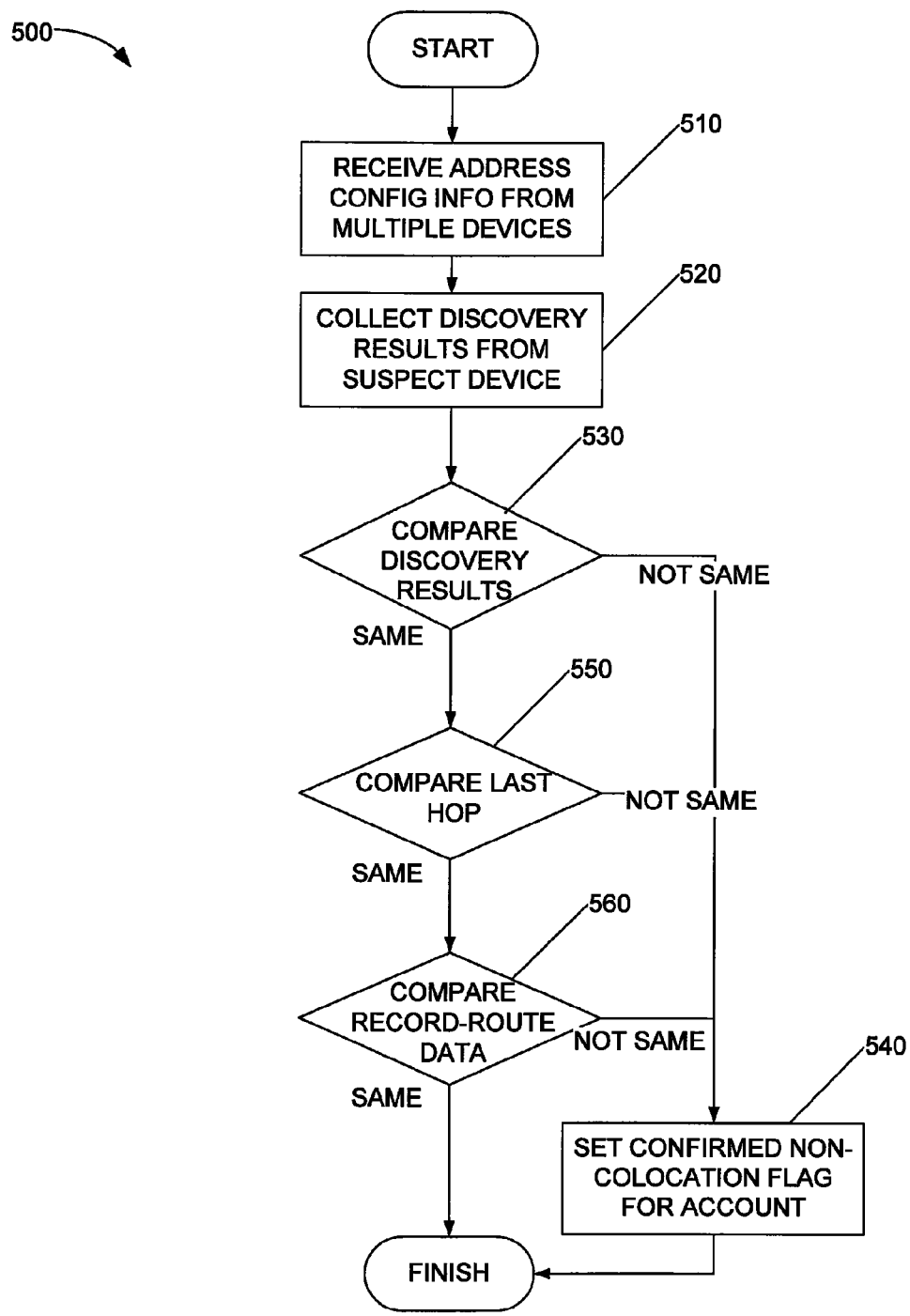
FIG. 5 is a flowchart illustrating another process performed by an embodiment of the detection logic from FIG. 1.

FIG. 5 is a flowchart illustrating a process performed by one embodiment of detection logic 190, which correlates address information from devices that are suspected of not being colocated, to make a more informed decision about whether a device is colocated or not. Process 500 begins at block 510, where address configuration information is received from various subscriber devices 110 that are associated with the same customer account. The address configuration information may describe the subscriber device 110, the last hop router that the subscriber device 110 communicates with, and/or other subscriber devices in the same multicast group as the subscriber device 110. The address configuration may include addresses at various layers in the protocol stack, for example, a MAC address, and/or an IP address. The address configuration information may also include a flag which indicates whether the IP address of the device has been translated, i.e., a network address translation (NAT) flag.

Processing continues at block 520, which begins a process of comparing address information for the various subscriber devices 110, and detecting differences among them. Subscriber devices 110 that are colocated are in the same multicast group. Therefore, a subscriber device 110 should be able to find all other subscriber devices on the same account through a multicast discovery process. Block 520 requests a subscriber device 110 that is suspected of non-co-location to discover the other subscriber devices on the same account, and receives the discovery results. In one embodiment, Universal Plug and Play (UPnP) discovery is used to find other subscriber devices, but other multicast discovery schemes are also contemplated. Block 530 compares the list of discovered subscriber devices with a list of subscriber devices that are associated with the same customer account. A subscriber device 110 that is associated with the customer account but is not present on the list of discovered subscriber devices is an indication the missing device is not colocated. In this case, a caution flag is set is set at block 540, and process 500 is complete. Colocated subscriber devices 110 also all share the same last hop router, so a subscriber device 110 that has a different last hop forwarding address (of the same address type) is not colocated. Thus, as an additional check, block 550 examines last hop forwarding addresses (if such information was obtained at block 510) for all devices 110 on the same account. If more than one address is detected, the confirmed non-colocation flag for the account is set at block 540, and process 500 is complete. Finally, colocated subscriber devices 110 can be expected to have not only the same last-hop forwarding device, but also to have the same hop-by-hop trail from the subscriber device to the forwarding device. Therefore, information generated by an IP datagram "record route" option (if such information was obtained at block 510) is analyzed at block 560 to determine co-location. If different routes are detected, the confirmed non-colocation flag for the account is set at block 540, and process 500 is complete.

Figure 6:
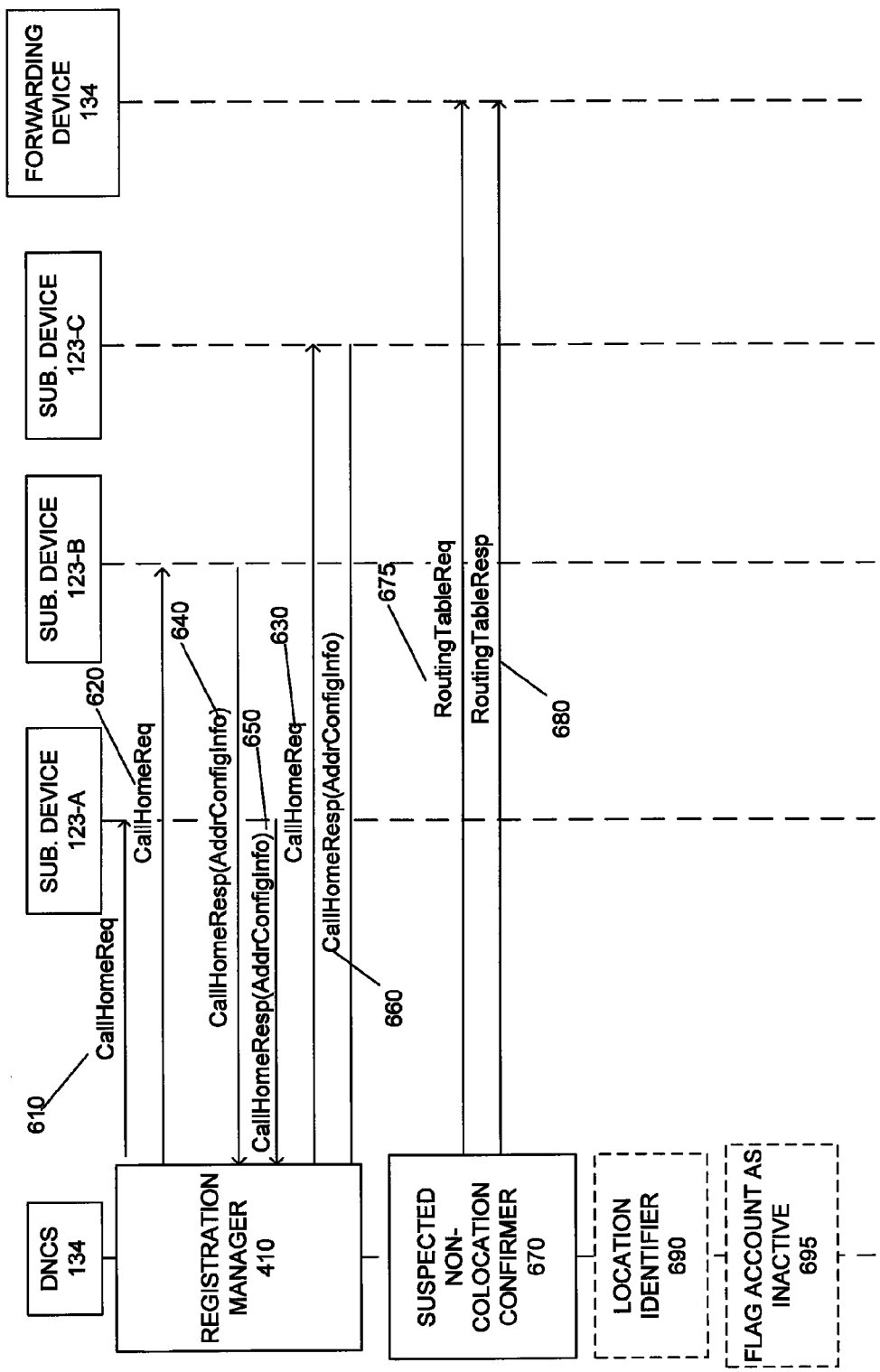
FIG. 6 is a messaging diagram showing interactions between one embodiment of the DNCS and one embodiment of the subscriber devices from FIG. 1.

FIG. 6 is a messaging diagram showing another interaction between one embodiment DNCS 130 and various subscriber devices 110, in which process 500 is executed. The message sequence begins (at some point after all devices for a particular account have logged on) with registration manager 410 sending a CallHomeRequest message to all subscriber devices 110 associated with a particular subscriber account. Each subscriber device 110 replies with a CallHomeResponse message which contains address configuration information. By requesting all devices to provide address information at the same point in time, the DNCS 130 can reduce the impact of non-persistent IP address binding. That is, using the address configuration information provided by subscriber devices 110 at log-on can be misleading, since devices log on at different times, and IP addresses are dynamically assigned in some configurations. This can lead to the following situation: device X logs on at time Tx, is assigned an IP address in subnet X, and reports this IP address to DNCS 130; device X is re-assigned a different IP address in subnet Y at time Tr; device Y logs on at time Ty, is assigned an address in subnet Y, and reports this IP address to DNCS 130. Because the IP address reports were separated in time, and IP addresses had been dynamically reassigned in between, some embodiments of DNCS 130 would view this as a suspicious case of non-colocated devices, even though both devices do have the same subnet and are colocated.

In the scenario illustrated in FIG. 6, there are three subscriber devices associated with the same account. Thus, registration manager 410 sends a CallHomeRequest message 610 to subscriber device 110-A, a CallHomeRequest message 620 to subscriber device 110-B, and a CallHomeRequest message 630 to subscriber device 110-C. At some later time, the subscriber devices reply (in this scenario, in a different order): subscriber device 110-A replies with a CallHomeResponse 650, subscriber device 110-B replies with a CallHomeResponse 640, and subscriber device 110-C replies with a CallHomeResponse 660.

It will be understood that the requests and responses can occur in any order, and that several requests can be outstanding at the same time. In some embodiments, the CallHome messages are authenticated and encrypted. In some embodiments, the request/responses 610-660 may take the form of an a DSM-CC User-to-Network pass-through message. In some embodiments, the address configuration information in the CallHomeResponse message (640, 650, 660) includes the types of information described above in connection with FIG. 5.

Having received all outstanding CallHome responses (640, 650, 660), suspected non-location confirmer 670 confirms whether any subscriber devices 110 that were registered for the same account are located at a different customer premise than the one associated with that account, as described above in connection with FIG. 5. In some embodiments, if non-colocated devices are confirmed, DNCS 130 requests (675) the relevant routing table from the last hop router 150 (e.g., using Router Information Protocol (RIP)), and last hop router 150 replies (680) with the routing table containing the route for the offending (non-colocated) subscriber device 110. (FIGS. 2A-C illustrate several network configurations in which last hop routers are located at different points in the network). Location identifier 690 then examines the routing table to determine the network location of the subscriber devices 110 registered on the account. Finally, DNCS 130 may flag (695) as inactive the account that is associated with the offending device.

In some embodiments, the messaging interaction of FIG. 6 occurs after the interaction of FIG. 4, whenever process 300 (in FIGS. 3 and 4) has in fact identified possible non-colocated subscriber devices 110. That is, the message exchanges and confirmation of suspected non-colocation that are shown in FIG. 6 occur only if process 300 has in fact identified possible non-colocated subscriber devices 110. In some embodiments, the message exchanges and confirmation of suspected non-colocation that are shown in FIG. 6 occur regardless of the outcome of process 300, for example, on a periodic basis. That is, some embodiments may proactively audit the subscriber devices 110.

In addition to the methods of detection and confirmation of non-colocation described above in connection with FIGS. 3 and 5, several other mechanisms are now described. One such mechanism involves one of the subscriber devices 110 sending a ping packet to each other subscriber device 110 in its customer account, where the ping packet has the "record route" flag set in the IP header. The record route trace generated by the packet would indicate whether or not the ping packet went outside of the customer premise 170, and thus, whether or not any of the subscriber devices 110 violate the colocation requirement. The standard Internet Control Message Protocol (ICMP) Echo Request can be used for the ping packet, or an application-layer ping packet can be used.

Another mechanism involves DNCS 130 sending a series of ping packets (ICMP or application-layer) with small but increasing time-to-live values (TTLs) to each subscriber device 110 in the customer account. Intervening routers between DNCS 130 and subscriber devices 110 would report timeouts, and these timeouts allow DNCS 130 to determine the path between DNCS 130 and each subscriber device 110. Another alternative involves one of the subscriber devices 110 sending a series of ping packets (ICMP or application-layer) with small but increasing time-to-live values (TTLs) to each subscriber device 110 in its customer account. DNCS 130 then collects and analyzes the traces to determine the path between DNCS 130 and each subscriber device 110.

Figure 7:
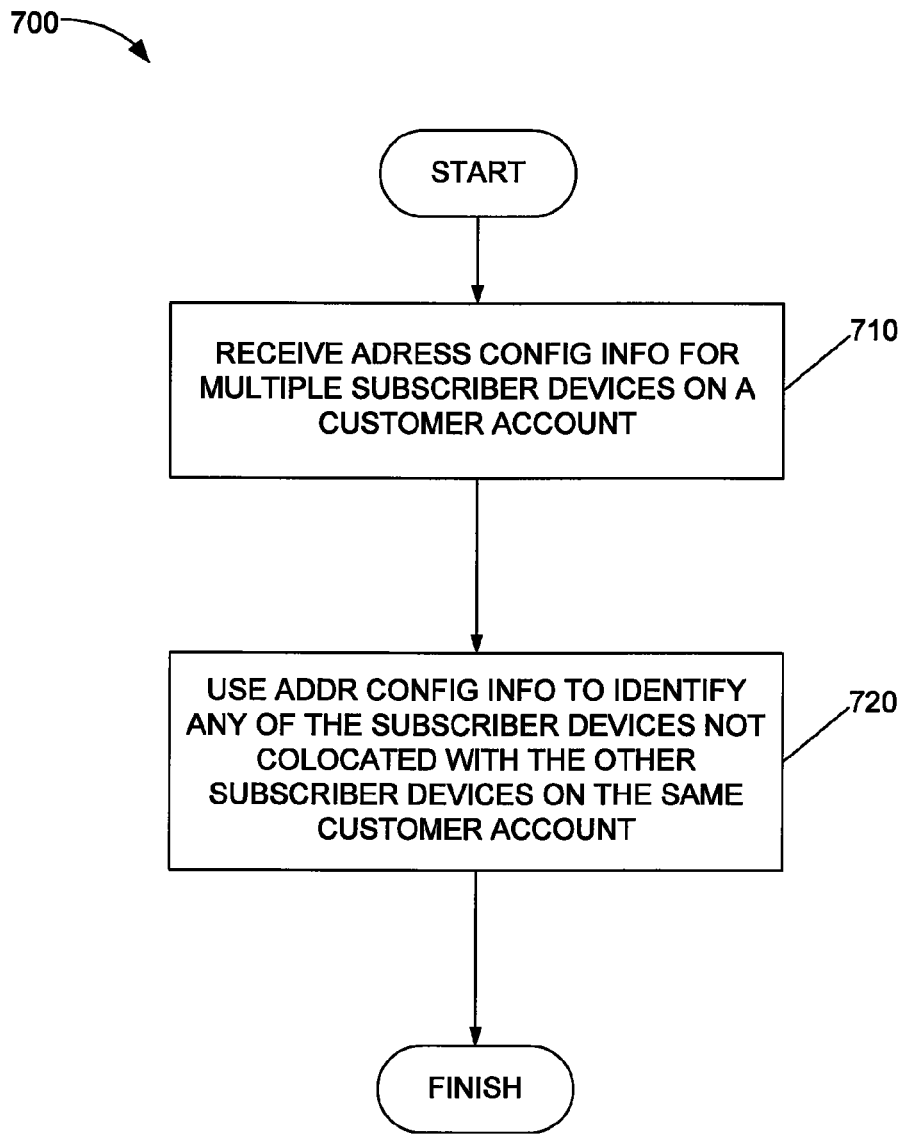
FIG. 7 is a flowchart illustrating a process performed by one embodiment of detection logic from FIG. 1.

FIG. 7 is a flowchart illustrating a process performed by one embodiment of detection logic 190. Process 700 starts at block 710, where address configuration information is received for multiple subscriber devices associated with the same customer account. Process 700 continues at block 720, where the address configuration information is used to identify any of the subscriber devices that are not colocated with the other subscriber devices on that customer account. Process 700 is then complete.

Figure 8:
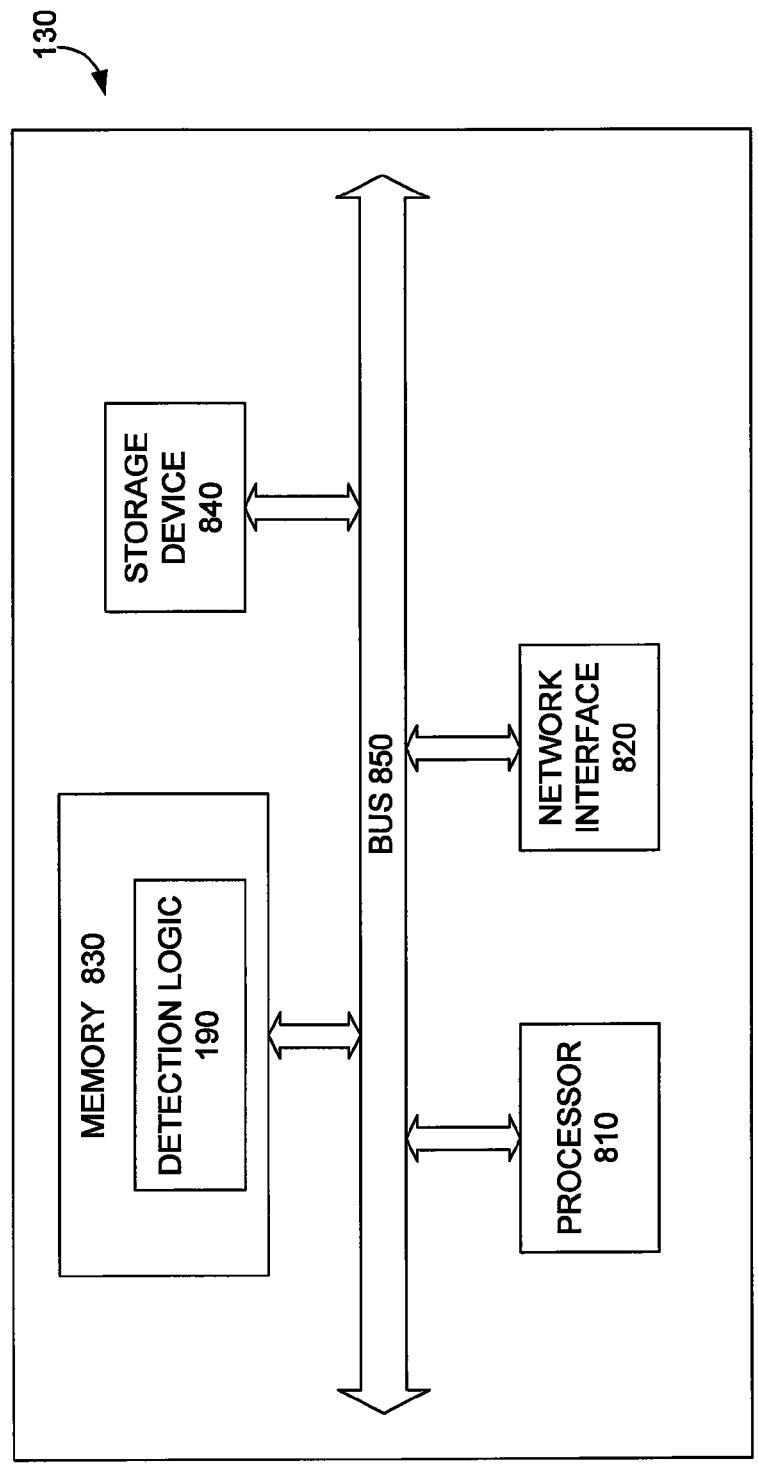
FIG. 8 is a hardware block diagram of a general-purpose computing device which can be used to implement various embodiments of a system and method for detecting non-colocated subscriber devices.

FIG. 8 is a hardware block diagram of one embodiment of digital network control system (DNCS) 130. DNCS 130 contains a number of components that are well known in the computer arts, including a processor 810, a network interface 820, memory 830, and storage device 840. These components are coupled via a bus 850. Omitted from FIG. 8 are a number of conventional components that are unnecessary to explain the operation of DNCS 130.

The systems and methods for detecting non-colocated subscriber devices disclosed herein can be implemented in software, hardware, or a combination thereof. In some embodiments, such as that shown in FIG. 8, the systems and/or method are implemented in software that is stored in memory 830 and executed by a suitable processor 810 (e.g., a microprocessor, network processor, microcontroller, etc.) residing in a computing device. In other embodiments, the system and/or method is implemented in hardware logic, including, but not limited to, a programmable logic device (PLD), programmable gate array (PGA), field programmable gate array (FPGA), an application-specific integrated circuit (ASIC), a system on chip (SoC), and a system in package (SiP).

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: a random access memory (RAM); a read-only memory (ROM); an erasable programmable read-only memory (EPROM or Flash memory). A specific example using magnetic technology includes (but is not limited to) a floppy diskette or a hard disk. Specific examples using optical technology include (but are not limited to) a compact disc read-only memory (CD-ROM).

The software components illustrated herein are abstractions chosen to illustrate how functionality is partitioned among components in some embodiments of the systems and methods for detecting non-colocated subscriber devices disclosed herein. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by the systems and methods for detecting non-colocated subscriber devices are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of logic for detecting non-colocated subscriber devices, according to embodiments disclosed herein. Alternatively, these diagrams may be viewed as depicting actions of an example of a method implemented by logic for detecting non-colocated subscriber devices. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:
1. A method comprising:
    receiving address configuration information for each of a plurality of subscriber devices associated with a customer account, wherein the address configuration information comprises IP address of each of the plurality of subscribers devices;

determining whether the IP address of each of the plurality of subscribers include network address translated (NAT) flag;
determining, when the IP address include NAT flag, whether the IP address of each of the plurality of subscribers devices are the same; and
setting a caution level to high for a subscriber device, when one of the IP addresses of the plurality of subscriber devices are not the same, wherein the caution level is indicative of a likelihood of the subscriber device not being colocated.

2. The method of claim 1, further comprising:
determining whether the caution level associated with one of the subscriber devices is set;
responsive to the caution level determination, receiving second address configuration information for each of the subscriber devices associated with the same customer account; and
confirming, using the second address configuration information, that the selected subscriber device is not colocated with the other subscriber devices.

3. The method of claim 1, wherein receiving the address configuration information further comprises receiving an IP address of a last hop router for the corresponding subscriber device, and further comprising:
determining whether the IP address of the last hop router for each of the plurality of subscribers devices are same; and
setting the caution level to medium for a subscriber device, when a IP address of the last hop router of the subscriber device is not same.

4. The method of claim 1, wherein the address configuration information comprises a MAC address of a first hop router for the corresponding subscriber device.

5. The method of claim 1, wherein receiving the address configuration information further comprises receiving a hop list of IP addresses representing every hop between the corresponding subscriber device and a device performing the method.

6. The method of claim 1, wherein each subscriber device belongs to an IGMP group and the address configuration information comprises a MAC address of the corresponding subscriber device and a list of MAC addresses for other subscriber devices within the IGMP group.

7. The method of claim 1, further comprising:
receiving configuration information for each of the subscriber devices during a log-on by the corresponding subscriber device, and
wherein the identifying is performed responsive to receiving the configuration information.

8. The method of claim 1, further comprising:
examining a routing table from a last hop router for each identified subscriber device to find a physical location for each identified subscriber device.

9. The method of claim 1, wherein receiving the address configuration information for each of the plurality of subscriber devices associated with the customer account, comprises:
sending a request to each of the plurality of subscriber devices associated with the customer account to provide the configuration information in a first order;
receiving the address configuration information from each of the plurality of subscriber devices in a second order, wherein the first order and second order are different.

10. The method of claim 1, wherein receiving the address configuration information for each of the plurality of subscriber devices associated with the customer account, comprises:
sending a request to each of the plurality of subscriber devices associated with the customer account to provide the configuration information with a same time stamp;
receiving the address configuration information from each of the plurality of subscriber devices.

11. A digital network control system non-transitory computer-readable medium comprising:
a registration manager configured to:
receive address configuration information for each of a plurality of subscriber devices associated with a same customer account, wherein receiving address configuration information for each of the plurality of subscriber devices comprises receiving IP address of each of the plurality of subscribers devices; and a non-colocation detector configured to:
determine whether the IP address of each of the plurality of subscribers devices belong to a same IP subnet; and
set a caution level to low for a subscriber device, when the subscriber devices does not have the same IP subnet, wherein the caution level is indicative of a likelihood of the subscriber device not being colocated.

12. The system of claim 11, wherein each subscriber device belongs to an IGMP group and the address configuration information comprises a MAC address of the corresponding subscriber device and a list of MAC addresses for other subscriber devices within the IGMP group.

13. The system of claim 11, wherein receiving the address configuration information further comprises receiving an IP address of a last hop router for each of the plurality of subscriber devices, and wherein the non-colocation detector is further configured to:
determine whether the IP address of the last hop router for each of the plurality of subscribers devices are same; and
set the caution level to medium for a subscriber device, when a IP address of the last hop router of the subscriber device is not same.

14. The system of claim 11, wherein receiving the address configuration information further comprises receiving a hop-by-hop trail from each of the plurality of subscriber devices to a forwarding device, and wherein the non-colocation detector is further configured to:
compare the hop-by-hop trail of each of the plurality of subscribers devices; and
set the caution level to medium for a subscriber device, when a hop-by-hop trail for the subscriber device is not same.

15. The system of claim 11, wherein receiving the address configuration information further comprises receiving an IP address of a DHCP server associated with each of the plurality of subscriber devices, and wherein the non-colocation detector is further configured to:
determine whether the IP address of the DHCP server for each of the plurality of subscribers devices are same; and
set the caution level to medium for a subscriber device, when a IP address of the DHCP server of the subscriber device is not same.

16. A digital network control system comprising:
a processor programmed to:
receive address configuration information of a subscriber device associated with a customer account, wherein receiving address configuration information comprises receiving a multicast group discovery result, wherein multicast group discovery result comprises a list of subscriber devices which are part of the multicast group of the subscriber device;

compare the list of subscriber devices from the multicast group discovery result with a list of subscriber devices associated with the customer account; and set a caution level to high for a subscriber device in the list associated with the customer account and not listed in the list of the subscriber devices from the multicast group discovery, wherein the caution level is indicative of a likelihood of the subscriber device not being colocated.

17. The system of claim 16, wherein the processor is further configured to:

determine whether the caution level associated with one of the subscriber devices is set;

receive second address configuration information for each of the subscriber devices associated with the same customer account in response to the processor determining whether the caution level associated with one of the subscriber devices is set; and confirm, using the second address configuration information, that the selected subscriber device is not colocated with the other subscriber devices.

18. The system of claim 16, wherein receiving the address configuration information further comprises receiving an IP address of a last hop router for each of the plurality of subscriber devices, and wherein the processor is further configured to:

determine whether the IP address of the last hop router for each of the plurality of subscribers devices are same; and set the caution level to medium for a subscriber device, when a IP address of the last hop router of the subscriber device is not same.

19. The system of claim 16, wherein receiving the address configuration information further comprises receiving a hop-by-hop trail from each of the plurality of subscriber devices to a forwarding device, and wherein the processor is further configured to:

compare the hop-by-hop trail of each of the plurality of subscribers devices; and set the caution level to medium for a subscriber device, when a hop-by-hop trail for the subscriber device is not same.

20. The system of claim 16, wherein receiving the address configuration information further comprises receiving a hop-by-hop trail from each of the plurality of subscriber devices to a forwarding device, and wherein the processor is further configured to:

compare the hop-by-hop trail of each of the plurality of subscribers devices; and set the caution level to medium for a subscriber device, when a hop-by-hop trail for the subscriber device is not same.

* * * * *